US012600445B1

(12) United States Patent
Wang et al.

(10) Patent No.: US 12,600,445 B1
(45) Date of Patent: Apr. 14, 2026

(54) MARINE RESCUE SEARCHLIGHT SYSTEM WITH DUAL-AXIS AZIMUTH CONTROL AND GYRO-STABILIZED BEAM PROJECTION

(71) Applicants: GENERAL LUMINAIRE (SHANGHAI) CO., LTD., Shanghai City (CN); GENERAL LUMINAIRE (KUNSHAN) CO., LTD., Kunshan City (CN)

(72) Inventors: Yung-Hong Wang, Shanghai City (CN); Chien Lee, Shanghai City (CN)

( * ) Notice: Subject to any disclaimer, the term of this patent is extended or adjusted under 35 U.S.C. 154(b) by 0 days.

(21) Appl. No.: 19/334,997

(22) Filed: Sep. 22, 2025

(51) Int. Cl.

| | |
|---|---|
| ***B63B 45/02*** | (2006.01) |
| ***F21V 21/15*** | (2006.01) |
| ***F21V 21/30*** | (2006.01) |
| ***H05B 45/10*** | (2020.01) |
| ***H05B 47/115*** | (2020.01) |
| ***H05B 47/17*** | (2020.01) |
| *F21Y 115/10* | (2016.01) |

(52) U.S. Cl.
CPC .............. *B63B 45/02* (2013.01); *F21V 21/15* (2013.01); *F21V 21/30* (2013.01); *H05B 45/10* (2020.01); *H05B 47/115* (2020.01); *H05B 47/17* (2020.01); *F21Y 2115/10* (2016.08)

(58) Field of Classification Search
CPC ......... B63B 45/02; F21V 21/15; F21V 21/30; H05B 45/10; H05B 47/115; H05B 47/17; F21Y 2115/10
See application file for complete search history.

(56) References Cited

U.S. PATENT DOCUMENTS

| | | | | |
|---|---|---|---|---|
| 10,308,330 | B1 * | 6/2019 | Spivak | F21V 21/15 |
| 11,900,668 | B2 * | 2/2024 | Biancale | G06V 20/00 |
| 12,372,214 | B1 * | 7/2025 | Jean | F21S 8/03 |
| 2008/0062816 | A1 * | 3/2008 | Leal | B63C 9/0005 367/93 |
| 2008/0258968 | A1 * | 10/2008 | Kim | G08B 25/016 441/89 |
| 2012/0120673 | A1 * | 5/2012 | Anderson | F21S 41/675 429/100 |
| 2019/0342482 | A1 * | 11/2019 | Totsch | H04N 23/20 |
| 2020/0023926 | A1 * | 1/2020 | Sandberg | G05D 1/0038 |
| 2020/0031438 | A1 * | 1/2020 | Moses | G01S 5/0231 |
| 2020/0255104 | A1 * | 8/2020 | Gonring | B63H 21/21 |

* cited by examiner

*Primary Examiner* — Christopher E Dunay

(57) ABSTRACT

A marine rescue searchlight system with dual-axis azimuth control and gyro-stabilized beam projection includes a life jacket, a searchlight, and a control module. The searchlight has an azimuth control structure capable of 360-degree horizontal rotation and 270-degree elevation/depression angle adjustment, a gyroscope, and an LED light source module with a built-in adjustable zoom structure. When the life jacket falls into water and outputs a survival signal containing a survival coordinate, the control module uses the survival coordinate to calculate azimuth and distance and drive the azimuth control structure to rotate the horizontal angle and adjust the elevation/depression angle. If the distance is greater/smaller than a first/second benchmark value, the LED light source module will be driven to respectively increase/decrease the central light intensity and adjust the angle of incidence to a narrow/wide angle to accurately project a beam onto the life jacket to assist in the rescue operation.

7 Claims, 2 Drawing Sheets

MARINE RESCUE SEARCHLIGHT SYSTEM WITH DUAL-AXIS AZIMUTH CONTROL AND GYRO-STABILIZED BEAM PROJECTION

BACKGROUND OF THE DISCLOSURE

Technical Field

The present disclosure relates to a rescue searchlight and particularly relates to a marine rescue searchlight system with dual-axis azimuth control and gyro-stabilized beam projection.

Description of the Related Art

In maritime rescue operations, the location and distance of victims or life-saving equipment in the water are mainly determined by visual observation, radar scanning, infrared photography or maritime radio, and searchlights are manually or semi-automatically controlled to illuminate the search. When receiving the location information, the crew manually adjusts the horizontal and vertical angles of the searchlight, and directs the beam to assist visual confirmation and operational feasibility of the rescue operations. However, this rescue method has several drawbacks and shortcomings. Firstly, due to the constant rocking and tilting of the hull of the rescue boat caused by waves, traditional searchlights struggle to maintain a stable beam direction, resulting in light source deviation and reduced illumination accuracy, and affecting rescue efficiency. Secondly, most existing searchlights do not have a zoom function and cannot actively adjust the light intensity and beam emission angle according to the distance between the victim who falls into the water and the hull of the rescue boat. As a result, near-range illumination may be too glaring and far-range illumination may be insufficient, making it difficult to effectively improve visual recognition and search and rescue reliability.

Furthermore, while some advanced lifesaving equipment currently incorporates an Automatic Identification System (AIS) that automatically transmits location information to nearby vessels or shore stations when the victim falls overboard, this type of AIS primarily transmits location information and is not integrated with the marine searchlights or other lighting equipment. Consequently, after receiving the location information, the crew is still required to manually adjust the light source direction based on the AIS coordinates, thereby increasing workload and hindering the immediate response required for the rescue. In addition, when multiple victims fall overboard, signals overlap, or in bad weather conditions, the reception and identification of AIS signals may experience errors or delays, further affecting rescue efficiency. More importantly, AIS itself lacks a mechanism for real-time guidance of precise beams, and is unable to support automated illumination search and dynamic beam control. It also lacks the beam stabilization and switching mechanism for wide-area or concentrated illumination required for the rescue operations.

In view of these drawbacks and deficiencies, it is a subject of the present disclosure to provide a marine rescue searchlight system with automatic positioning, autonomous control of beam direction and intensity, and anti-fluctuation stability to overcome the above-mentioned drawbacks and deficiencies of the related art.

SUMMARY OF THE DISCLOSURE

The primary objective of the present disclosure is to provide an automatic directional and luminous marine rescue searchlight system. When the system receives a life-saving signal from a life jacket, it automatically adjusts the direction and distance of the searchlight's beam projection to illuminate the life jacket, thereby improving the mood of those who are waiting for rescue at sea.

To achieve the aforementioned objective, the present disclosure discloses a marine rescue searchlight system with dual-axis azimuth control and gyro-stabilized beam projection, the marine rescue searchlight system includes: at least one life jacket, having a detector and a lifesaving locator, in which when the detector detects that the life jacket has fallen into water, the lifesaving locator measures a survival signal containing a survival coordinate and outputs the survival signal through a specific frequency; a searchlight, installed on a boat, and including: a base, provided with an azimuth control structure and a gyroscope, the azimuth control structure is capable of 360-degree horizontal rotation and 270-degree elevation/depression angle adjustment, and the gyroscope is connected to the azimuth control structure, for compensating a tilt angle caused by waves and stabilizing the azimuth control structure; and an LED light source module, connected to and installed on the azimuth control structure, and provided with a built-in adjustable zoom structure for adjusting the central light intensity and the angle of incidence to emit a beam with a searchlight distance of 10 m~2 km; and a control module, installed on the boat, and having a communication element and a positioning element, the communication element is connected with the lifesaving locator and the LED light source module via signals, and the positioning element measures and records a boat position of the boat in real time; when the control module receives the survival signal, the survival coordinate is used to calculate an azimuth and a distance of the life jacket relative to the boat position, and drive the azimuth control structure to rotate in a horizontal angle and adjust the elevation/depression angle according to the azimuth and the distance, while using a first benchmark value to determine the distance, so that if the distance is greater than the first benchmark value, the LED light source module will be driven to enhance the central light intensity and adjust the angle of incidence to a narrow angle through the adjustable zoom structure; a second benchmark value is used to determine the distance, so that if the distance is smaller than the second benchmark value, the LED light source module will be driven to reduce the central light intensity and adjust the angle of incidence to a narrow angle through the adjustable zoom structure, so as to precisely project a beam to the location of the life jacket.

Wherein, the control module is an Automatic Identification System (AIS) console. The life jacket is used in multiple statuses. When the control module receives each of the survival coordinates outputted by each of the lifesaving locators respectively to analyze and obtain each azimuth and each distance, each survival coordinate with a distance smaller than or equal to the first benchmark value is compiled, the adjacent distances between the survival coordinates are analyzed, and at least two survival coordinates with an adjacent distance smaller than the X value are grouped into a rescue team, so that the control module obtains at least one rescue team, and the optimal projection coordinate and corresponding optimal illumination area are obtained by calculating each distance and each azimuth corresponding to the rescue team, so as to adjust the azimuth control structure and the LED light source module accordingly. When the control module calculates and obtains the plurality of optimal illumination areas, the optimal projection coordinates and the optimal illumination areas are sorted based on the distances between the optimal projection coordinates and the boat, and the LED light source module emits a beam to each optimal projection coordinate in sequence over a time period of T. Wherein, X is 1~5 m, T is the continuous illumination over a time period of 20~50 seconds.

In addition, the positioning element is a Global Positioning System, (GPS) component, and the control module calculates the change of distance between the boat position and the survival coordinate in real time, so as to correspondingly adjust the central light intensity and the angle of incidence of the LED light source module through the adjustable zoom structure. The first benchmark value is 500 m, and the second benchmark value is 100 m.

In summation of the description above, the present disclosure addresses current problems in marine rescue operations, such as inaccurate searchlight positioning, unstable beams, complex operation, and a lack of real-time linkage with survival positioning signals. The system proposes a marine rescue searchlight system with dual-axis azimuth control and gyro-stabilized beam projection. The overall system design focuses on automated response, stable beam guidance, and intelligent illumination logic. The present disclosure significantly reduces crew operational burden and human error, while providing stable illumination to calm victims while they await rescue, and it also significantly enhances the safety, immediacy, and reliability of marine search and rescue missions.

The present disclosure utilizes an azimuth control structure capable of 360-degree horizontal rotation and 270-degree elevation/depression angle adjustment, combined with a gyroscope to compensate for boat tilt, to achieve stable beam direction capabilities. Furthermore, by utilizing an LED light source module with a built-in adjustable zoom structure, the searchlight can dynamically adjust the central light intensity and angle of incidence of the beam based on the relative distance from the victim in the water, thereby providing intelligent lighting control for both far-range convergence and near-range diffusion. In addition, the marine rescue searchlight system integrates AIS and GPS positioning functions through the control module. Upon receiving the survival signal, the system automatically calculates the optimal illumination azimuth and illumination parameters to automatically drive the positioning and illumination of the searchlight, so as to improve rescue efficiency while effectively soothing victims, as well as enhancing the success and smoothness of rescue operations.

The present disclosure further automatically groups and prioritizes the survival coordinates of multiple victims in the water and determines the optimal illumination area and projection path within the group of victims. This allows the searchlight to sequentially illuminate each rescue team's area, improving the efficiency and accuracy of multi-person rescue operations and effectively utilizing light resources.

DESCRIPTION OF THE PREFERRED EMBODIMENTS

In order to enable people having ordinary skill in the art to clearly understand the present disclosure, the following description is provided with accompanying drawings for your reference.

Figure 1:
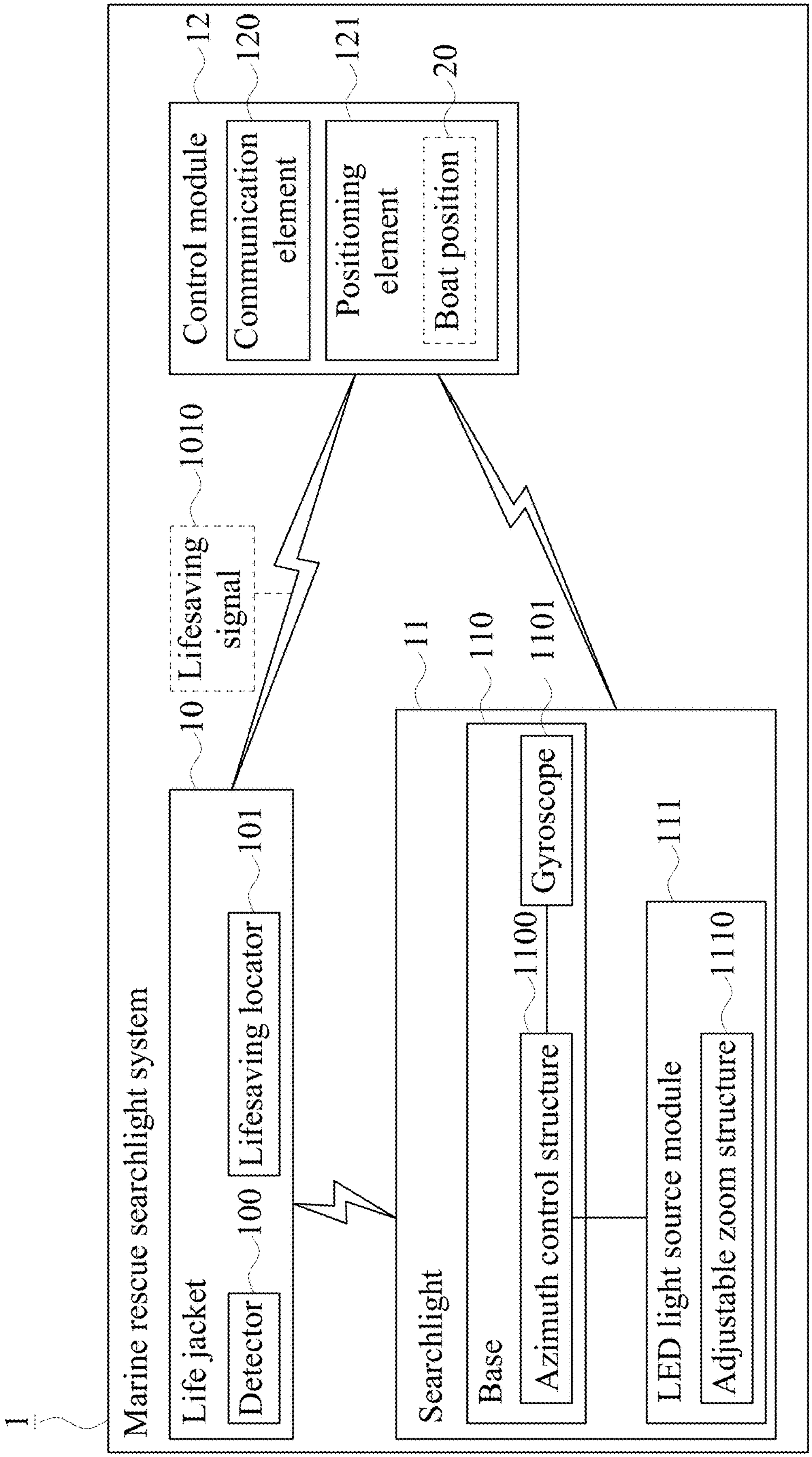
FIG. 1 is a schematic block diagram of a first preferred embodiment of the present disclosure.

With reference to FIG. 1 for the schematic block diagram of a marine rescue searchlight system with dual-axis azimuth control and gyro-stabilized beam projection 1 in accordance with the first preferred embodiment of the present disclosure, the marine rescue searchlight system with dual-axis azimuth control and gyro-stabilized beam projection 1 includes at least one life jacket 10, a searchlight 11 and a control module 12. The life jacket 10 includes a detector 100 and a lifesaving locator 101, the searchlight 11 is installed on a boat (not shown in the figure) and has a base 110 and an LED light source module 11. The control module 12 is installed on the boat and provided with a communication element 120 and a positioning element 121. The base 110 has an azimuth control structure 1100 and a gyroscope 1101, and the LED light source module 111 is connected to and installed on the azimuth control structure 1100. The azimuth control structure 1100 is capable of 360-degree horizontal rotation and 270-degree elevation/depression angle adjustment, and the gyroscope 1101 is connected to the azimuth control structure 1100 for compensating the tilt angle caused by waves and stabilizing the azimuth control structure 1100, so as to stabilize the azimuth of illumination of the LED light source module 111. The LED light source module 111 has a built-in adjustable zoom structure 1110 for adjusting the central light intensity and angle of incidence to emit a beam with a searchlight distance of 10 m~2 km.

The communication element 120 is connected with the lifesaving locator 101 and the LED light source module 111 via signals, and the positioning element 121 measures and records a boat position 20 of the boat in real time. When the detector 100 detects that the life jacket 10 has fallen into water, the lifesaving locator 101 calculates a survival signal 1010 containing a survival coordinate and outputs the survival signal 1010 through a specific frequency. When the control module 12 receives the survival signal 1010, the survival coordinate is used to calculate an azimuth and a distance of the life jacket 10 relative to the boat position 20, drive the azimuth control structure 1100 to rotate in a horizontal angle and adjust the elevation/depression angle according to the azimuth and the distance, while using a first benchmark value to determine the distance, and if the distance is greater than the first benchmark value, the LED light source module 111 will be driven to increase the central light intensity and adjust the angle of incidence to a narrow angle through the adjustable zoom structure 1110; or using a second benchmark value to determine the distance, and if the distance is smaller than the second benchmark value, the LED light source module 111 will be driven to reduce the central light intensity and adjust the angle of incidence to a wide angle through the adjustable zoom structure 1110, so as to precisely project a beam to the position of the life jacket 10 and lower the difficulty of rescue operations.

Figure 2:
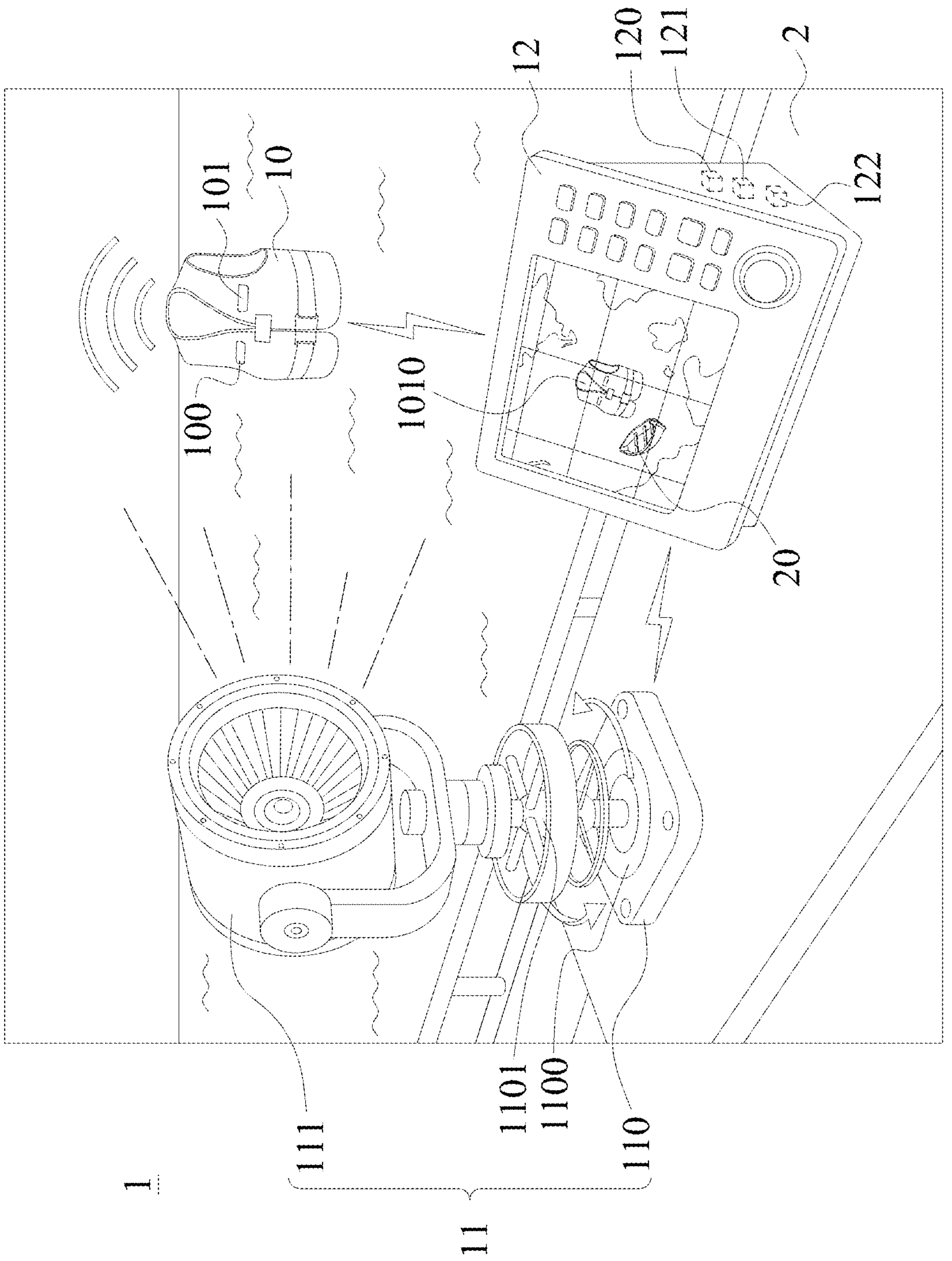
FIG. 2 is a schematic block diagram of a second preferred embodiment of the present disclosure.

With reference to FIG. 2 for the schematic block diagram of a marine rescue searchlight system with dual-axis azimuth control and gyro-stabilized beam projection in accordance with the second preferred embodiment of the present disclosure, the marine rescue searchlight system 1 includes at least one life jacket 10, a searchlight 11 and a control module 12. The life jacket 10 is worn by a person to enhance safety during marine activities. The searchlight 11 and the control module 12 are installed on a boat 2, such as a ferry or a ship. The life jacket 10 is equipped with a detector 100 and a lifesaving locator 101. The searchlight 11 includes a base 110 and an LED light source module 111, the base 110 has an azimuth control structure 1100 and a gyroscope 1101, the LED light source module 111 is connected to and installed on the azimuth control structure 1100, and the azimuth control structure 1100 has a horizontal rotation element and an elevation/depression adjusting element which provide the functions of 360-degree horizontal rotation and 270-degree elevation/depression angle adjustment. The LED light source module 111 has a built-in adjustable zoom structure (not shown in the figure), and includes a group of focusing lenses that can move along the optical axis, and vary the distance between the optical lens and the LED light source in the LED light source module 111 in order to adjust the central light intensity and the angle of incidence. This allows the switching between spotlight and floodlight modes, and the emission of a beam with a searchlight distance of 10 m to 2 km to illuminate and search for victims who have fallen into the sea, either nearby or at a distance, while providing a sense of psychological security. Furthermore, these optical lenses can be designed as dual-lens plates to achieve rapid zoom or enhanced zoom effects through the adjustment of the concave and convex micro-lenses.

The control module 12, such as an Automatic Identification System (AIS) console on a ship, is equipped with a communication element 120, a positioning element 121, and a memory unit 122. The communication element 120 is connected to the lifesaving locator 101 and the LED light source module 111 via signals. The positioning element 121, such as a Global Positioning System (GPS) element, measures the position 20 of the boat 2 in real time and records the boat position 20 in the memory unit 122 for future reference.

When a victim falls overboard from the boat 2, the detector 100 detects that the life jacket 10 has fallen into water. The lifesaving locator 101 measures and outputs a survival signal 1010 containing a survival coordinate and outputs the survival signal 1010 via a specific frequency, such as the frequency of 161.975 MHz or 162.025 MHz, and a dedicated maritime frequency of 406 MHz commonly used by AIS consoles. When the control module 12 receives the survival signal 1010, it uses the survival coordinate to calculate the azimuth and distance of the life jacket 10 relative to the boat position 20. Based on the azimuth and distance, the azimuth control structure 1100 is driven to rotate the horizontal angle and adjust the elevation/depression angle of the LED light source module 111. Meanwhile, the control module 12 uses a first benchmark value, such as 500 meters, to determine the distance. If the distance is greater than the first benchmark value, the control module 12 will drive the LED light source module 111 through the adjustable zoom structure to increase the central light intensity and adjust the angle of incidence to a narrow angle, thereby forming a focused beam for far-range illumination. Furthermore, the control module 12 uses a second benchmark value, such as 100 meters, to determine the distance. If the distance is smaller than the second benchmark value, the control module 111 will drive the LED light source module 111 through the adjustable zoom structure to reduce the central light intensity and adjust the angle of incidence to a wide angle, thereby providing a near-range illumination without irritating the vision of the victims who have fallen into the sea. By adjusting the focus or beam projection, the system can improve the accuracy of beam projection onto the life jacket 10, thereby providing appropriate lighting to comfort the victims in the sea and enhance their psychological safety.

In this embodiment, the control module 12 calculates the change of the distance between the boat position 20 and the survival coordinate in real time, and fine-tunes the central light intensity and angle of incidence of the LED light source module 111 accordingly through the adjustable zoom structure to maintain a constant projected beam illumination. In addition, the life jacket 10 is used in plurality statuses, and when the control module 12 receives each of the survival coordinates outputted by each of the lifesaving locators 101 respectively to analyze and obtain each azimuth and each distance, each survival coordinate with a distance smaller than or equal to the first benchmark value is compiled, the adjacent distances between the survival coordinates are analyzed, and at least two survival coordinates with an adjacent distance smaller than the X value such as 1~5 m are grouped into a rescue team, so that the control module obtains at least one rescue team, and the optimal projection coordinate and corresponding optimal illumination area are obtained by calculating each distance and each azimuth corresponding to the rescue team, so as to adjust the azimuth control structure 1100 and the LED light source module 111 accordingly. Wherein, the optimal projection coordinate is generally the relative center of the survival coordinates in the rescue team, and the optimal illumination area refers to the range of the beam projected by the LED light source module 111, in which the LED light source module 111 can project a beam with an optimal illumination intensity to illuminate the survival coordinates.

When the control module 12 calculates the plurality of optimal illumination areas, it further sorts the optimal projection coordinates and the optimal illumination areas according to the relative distance between the optimal projection coordinates and the boat position 20. The LED light source module 111 emits a beam to each optimal projection coordinate in sequence according to the distance, with a continuous illumination over a time period T, for example, 20 to 50 seconds. In this way, when an accident occurs in which multiple victims fall into the sea, the marine rescue searchlight system 1 will project a beam that covers as many victims as possible in the vicinity, and then illuminates each of the rescue team members in turn, soothing the anxiety of the victims who have fallen into the sea while waiting for rescue. It is noteworthy that the number of survival coordinates that can be included into a rescue team may be capped at an upper limit, for example, a rescue team may only accommodate three or four survival coordinates. The number of survival coordinates set in a rescue team is calculated based on the order in which the control module 12 receives the survival signal 1010. Once the number of survival coordinates set in a rescue team is full, further survival coordinates will be set in a new rescue team.

What is claimed is:

1. A marine rescue searchlight system with dual-axis azimuth control and gyro-stabilized beam projection, comprising:
   - at least one life jacket having a detector and a lifesaving locator, wherein, when the detector detects that the at least one life jacket has fallen into water, the lifesaving locator measures a survival signal containing a survival coordinate and transmits the survival signal through a specific frequency;
   - a searchlight installed on a boat and comprising:
     - a base having an azimuth control structure and a gyroscope, the azimuth control structure being capable of performing 360-degree horizontal rotation and 270-degree elevation/depression angle adjustment, and the gyroscope is coupled to the azimuth control structure for compensating a tilt angle caused by waves and stabilizing the azimuth control structure; and an LED light source module coupled to and installed on the azimuth control structure, and provided with a built-in adjustable zoom structure for adjusting a central light intensity and an angle of incidence to emit a beam with a searchlight distance of 10 m~2 km; and a control module installed on the boat and having a communication element and a positioning element, the communication element is coupled with the lifesaving locator and the LED light source module via signals, and the positioning element measures and records a boat position of the boat in real time, wherein when the control module receives the survival signal, the survival coordinate is used to calculate an azimuth and a distance of the at least one life jacket relative to the boat position, and drive the azimuth control structure to rotate in a horizontal angle and adjust an elevation/depression angle according to the azimuth and the distance such that:

in a case that the distance is greater than a first benchmark value, the LED light source module is driven to enhance the central light intensity and adjust the angle of incidence to a narrow angle through the adjustable zoom structure to precisely project a beam to a location of the at least one life jacket, and in a case that the distance is smaller than a second benchmark value, the LED light source module is driven to reduce the central light intensity and adjust the angle of incidence to a wide angle through the adjustable zoom structure to precisely project the beam to the location of the at least one life jacket.

2. The marine rescue searchlight system according to claim 1, wherein the control module is an Automatic Identification System (AIS) console.

3. The marine rescue searchlight system according to claim 2, wherein a plurality of life jackets, including the at least one life jacket, is provided, when the control module receives each of the survival coordinates outputted by each of the lifesaving locators, respectively, to analyze and obtain each azimuth and each distance, each survival coordinate with a distance smaller than or equal to the first benchmark value is compiled and adjacent distances between the survival coordinates are analyzed to group at least two survival coordinates with an adjacent distance smaller than an X value into a rescue team, so that the control module obtains at least one of the rescue team, and an optimal projection coordinate and a corresponding optimal illumination area are obtained by calculating each distance and each azimuth corresponding to the at least one of the rescue team, so as to adjust the azimuth control structure and the LED light source module accordingly.

4. The marine rescue searchlight system according to claim 3, wherein, when the control module calculates and obtains a plurality of optimal illumination areas, the optimal projection coordinates and the plurality of optimal illumination areas are sorted based on distances between the optimal projection coordinates and the boat, such that the LED light source module emits the beam to each optimal projection coordinate in sequence over a time period of T.

5. The marine rescue searchlight system according to claim 4, wherein X is 1~5 m, T is 20~50 seconds.

6. The marine rescue searchlight system according to claim 1, wherein the positioning element is a Global Positioning System, (GPS) element, and the control module calculate a change of distance between the boat position and the survival coordinate in real time, so as to correspondingly adjust the central light intensity and the angle of incidence of the LED light source module through the adjustable zoom structure.

7. The marine rescue searchlight system according to claim 1, wherein the first benchmark value is 500 m, and the second benchmark value is 100 m.

* * * * *